Jan. 21, 1941.  S. B. SMITH  2,229,195
FLOW METER SYSTEM
Filed Jan. 29, 1940  2 Sheets-Sheet 2
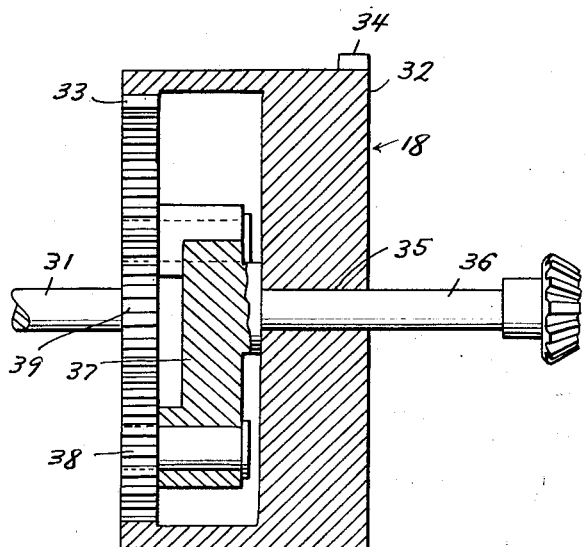
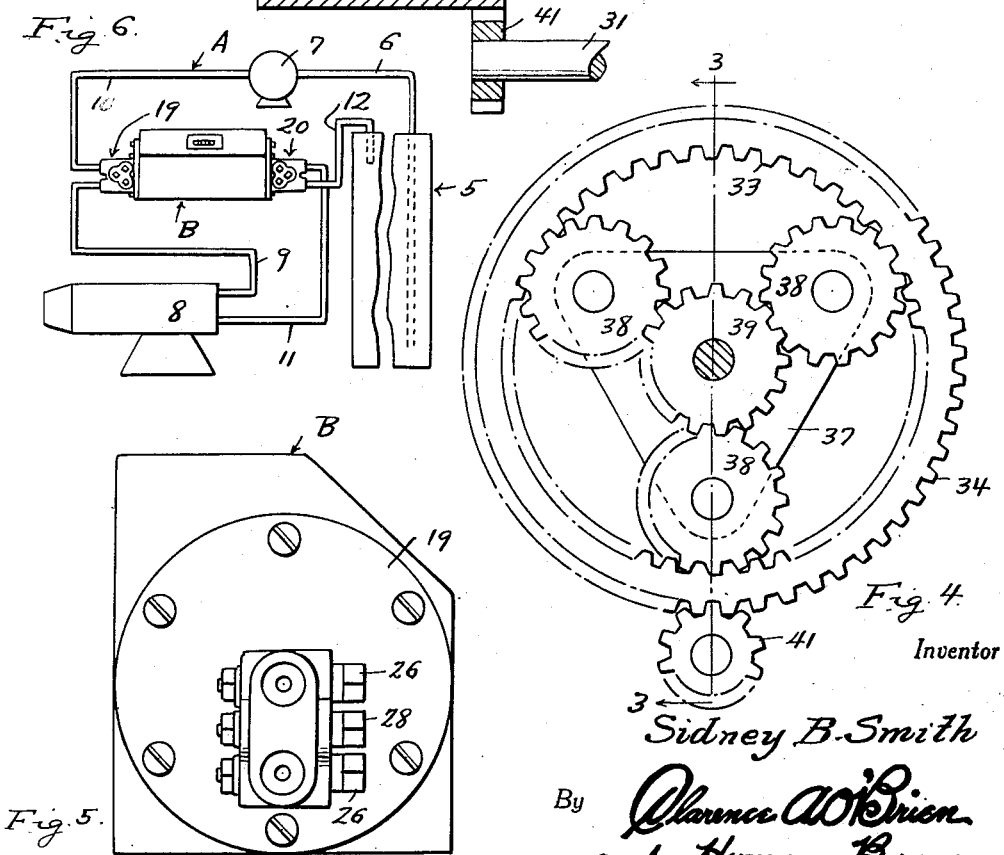
Inventor
Sidney B. Smith
By Clarence A. O'Brien
and Hyman Berman
Attorneys Patented Jan. 21, 1941

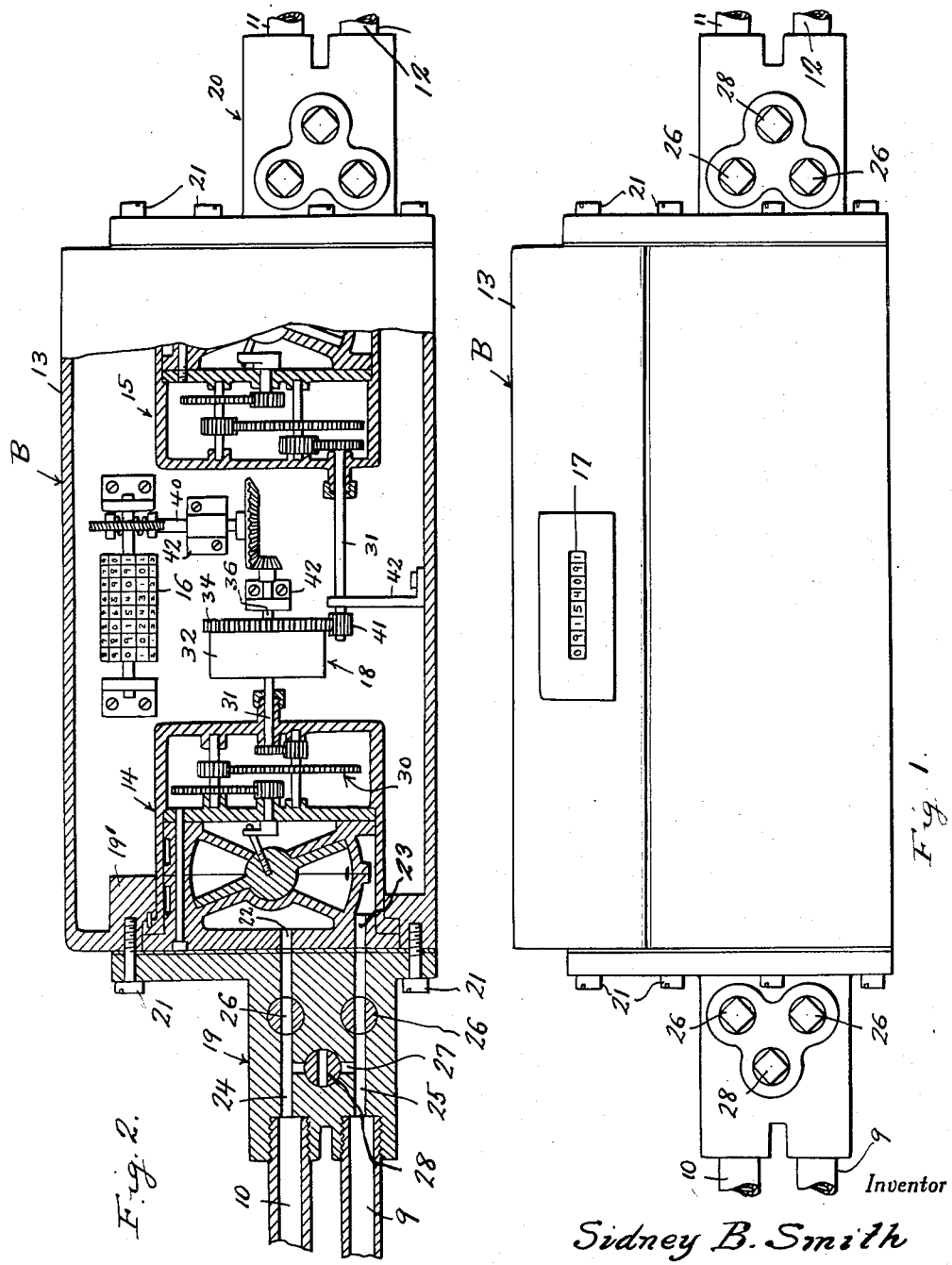

2,229,195

UNITED STATES PATENT OFFICE 2,229,195

FLOW METER SYSTEM

Sidney B. Smith, Long Island, N. Y.

Application January 29, 1940, Serial No. 316,252

2 Claims. (Cl. 73—195)

This invention relates to a flow meter system, and has for the primary object the provision of a device of this character which will be especially useful in a device for determining the consumption of fluid by a fluid consuming device wherein a system is employed that includes a constant supply of fluid from the source to the fluid consuming device and a return from the latter to the supply for fluid not consumed and feed and return meters and a single counting mechanism for both meters whereby through the use of this invention the result indicated by said counting mechanism will be the actual consumption of fluid by the fluid consuming device and to provide a device which may be easily installed with a minimum number of fittings and couplings and may have the major portion thereof removed without interrupting the operation of the system, that is the supply and return of the fluid between said fluid consuming device and the fluid supply.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating the exterior construction of the present invention.

Figure 2 is a side elevation, partly in section, showing the meters, single counter and the compounding gear mechanism between said meters and the counting mechanism, all mountable in an assembly unit for easy installation in a fluid supply system.

Figure 3 is a fragmentary vertical sectional view illustrating planetary gearing forming a part of the present invention, and taken on line 3—3 of Figure 4.

Figure 4 is a diagrammatical view illustrating the planetary gearing.

Figure 5 is an end view of the device.

Figure 6 is a diagrammatical view showing the present invention installed in a fluid system of the kind specified.

While this invention may be employed in various types of fluid systems, I have elected to show the installation thereof in connection with an oil burner system indicated generally by the character A in Figure 6 wherein the present invention is designated generally by the character B and composed of a unit readily installed in the system A through the use of a minimum number of couplings or fittings. This system A includes a fluid supply reservoir 5, an outlet pipe 6 connected thereto and to a pump 7. The burner is indicated by the character 8 and is connected to the unit B by a pipe 9 and the unit B is connected to the pump 7 by a pipe 10. The burner 8 has a return fluid pipe 11 connected thereto which is connected to the unit B and the latter has a return fluid pipe 12 connected thereto and to the reservoir 5. This briefly sets forth how the present invention is installed in a fluid system of a particular kind.

The unit B consists of a supporting housing 13, inlet and return meters 14 and 15 removably mounted therein and a counter mechanism 16 viewable through a window 17 and connected to said meters by a planetary compounding gear mechanism 18 and heads 19 and 20 for connecting the meters into the fluid system of the character described or some other fluid system wherein it is desired to accurately ascertain the amount of fluid utilized or consumed.

The housing 13 is of elongated formation and has in its ends flanged openings forming meter seats 19' in which are removably mounted the meters 14 and 15 in opposed relation. The meters are held in their seats by the heads 19 which are detachably secured to the ends of the housing 13 by stud bolts 21. Any type of fluid operated meters may be employed, preferably of the nutating disc type, as shown in the drawings and which form no part of the present invention.

The fluid inlet and outlet ports of the meters are indicated by the characters 22 and 23 and the heads have therein and communicating with said ports fluid inlet and outlet passages 24 and 25 and said passages are controlled by key operated valves 26. The passages 24 and 25 are connected by a bypass passage 27 also provided with a key operated control valve 28.

The inlet passage 24 of the head 19 is connected to the pipe 10 of the system and the outlet passage 25 is connected to the pipe 9. The inlet passage 24 of the head 20 is connected to the pipe 11 and the outlet passage 25 of said head 20 is connected to the pipe 12. Thus it will be seen that with the valves 26 in closed position and the valves 28 in open position, the system A can continue to operate while the meters and counting mechanism are rendered inoperative and furthermore it will be seen that during this period the housing 13 may be detached from the heads so that the meters, counting mechanism and compounding gear mechanism can all be removed from the system while the latter remains in operation for repair, adjustments or any other changes thereto.

The counting mechanism 16 may be of any ordinary type frequently employed for industrial counters, mileage indicators, etc.

The meters include the usual reduction gear trains 30 with power takeoff shafts 31.

The planetary compounding gear mechanism 18 includes a gear element 32 provided with an internal ring gear 33 and an external ring gear 34 and an axial bore 35 to rotatably receive a shaft 36. A spider gear bracket 37 is secured to the shaft 36 and operates within the gear element 32 and has journaled thereon spider gears 38 which mesh continuously with the internal ring gear 33 and also with a gear 39 secured on the takeoff shaft 31 of the meter 14. The shaft 36 is geared to a shaft 40 forming a part of the counting mechanism. A gear 41 is in continuous mesh with the ring gear 34 and is secured on the power takeoff shaft of the meter 15.

From the detailed description of the planetary compounding gear mechanism 18 it will be seen that the latter couples the meters 14 and 15 to the counting mechanism 16. Suitable brackets 42 may be employed for the support of the shafts referred to in connection with the meters, planetary compounding gear mechanism and the counter, the brackets being mountable on the housing 13 of the unit B.

From the foregoing description and the disclosure made by the drawings it will be seen that the feed and return meters connected to the counting mechanism by the planetary compounding gear mechanism will actuate the counter mechanism so that the reading thereof will indicate the correct amount of fluid consumed by the burner, the planetary compounding gear mechanism acting to subtract the motion of the return meter from the motion of the feed meter so that the result given by the counting mechanism will be the actual consumption of fluid by the fluid consuming device. If desired, the device may be easily arranged to give a result on the counting mechanism in addition instead of in subtraction, as stated, by reversing the motion given off by one meter to the motion given off by the other meter. This is easily accomplished through a simple rearrangement of the gearing of the planetary compounding gear mechanism to the meters or the power takeoff shafts thereof.

Further, it will be seen that this unit is extremely compact and its compactness is valuable in that it saves space and piping and expensive fittings and also permits less fittings to be employed and consequently less leaks are liable and through the use of the key operated valves tampering of the device by unauthorized persons will be to a great extent eliminated.

It is believed that the foregoing description, when taken in connection with the drawings will fully set forth the construction and advantages of this invention to those skilled in the art to which such a device relates, so that further detailed description will not be required.

Having described the invention, what I claim is:

1. In a device of the class described, a housing having a sight opening and flanged openings forming meter seats, meters carried by said seats, a counter mounted in said housing in rear of the sight opening, heads detachably connected to said housing and retaining the meters in the seats and provided with passages for connecting said meters into a fluid pressure system including a fluid pressure supply and a fluid consuming device and a fluid return from said consuming device to the fluid supply, control valves in said passages, and planetary gearing connecting the meters to the counting mechanism.

2. In a device of the class described, a housing having a sight opening and flanged openings forming meter seats, meters carried by said seats, a counter mounted in said housing in rear of the sight opening, heads detachably connected to said housing and retaining the meters in the seats and provided with passages for connecting said meters into a fluid pressure system including a fluid pressure supply and a fluid consuming device and a fluid return from said consuming device to the fluid supply, control valves in said passages, and planetary gearing connecting the meters to the counter, said heads having by-pass passages connecting the first-named passages thereof, and control valves in said by-pass passages.

SIDNEY B. SMITH.